July 29, 1952 F. KESSLER 2,605,362

TELEPHONE PARTY LINE INTERCEPT CIRCUIT

Filed July 7, 1948 4 Sheets-Sheet 1

INVENTOR.
FRANK KESSLER
BY
Winfred T. Powell
ATTORNEY

INVENTOR.
FRANK KESSLER
BY
Winfred T. Powell
ATTORNEY

TELEPHONE PARTY LINE INTERCEPT CIRCUIT

Filed July 7, 1948

4 Sheets-Sheet 3

INVENTOR.
FRANK KESSLER

BY

Winfred T. Powell
ATTORNEY

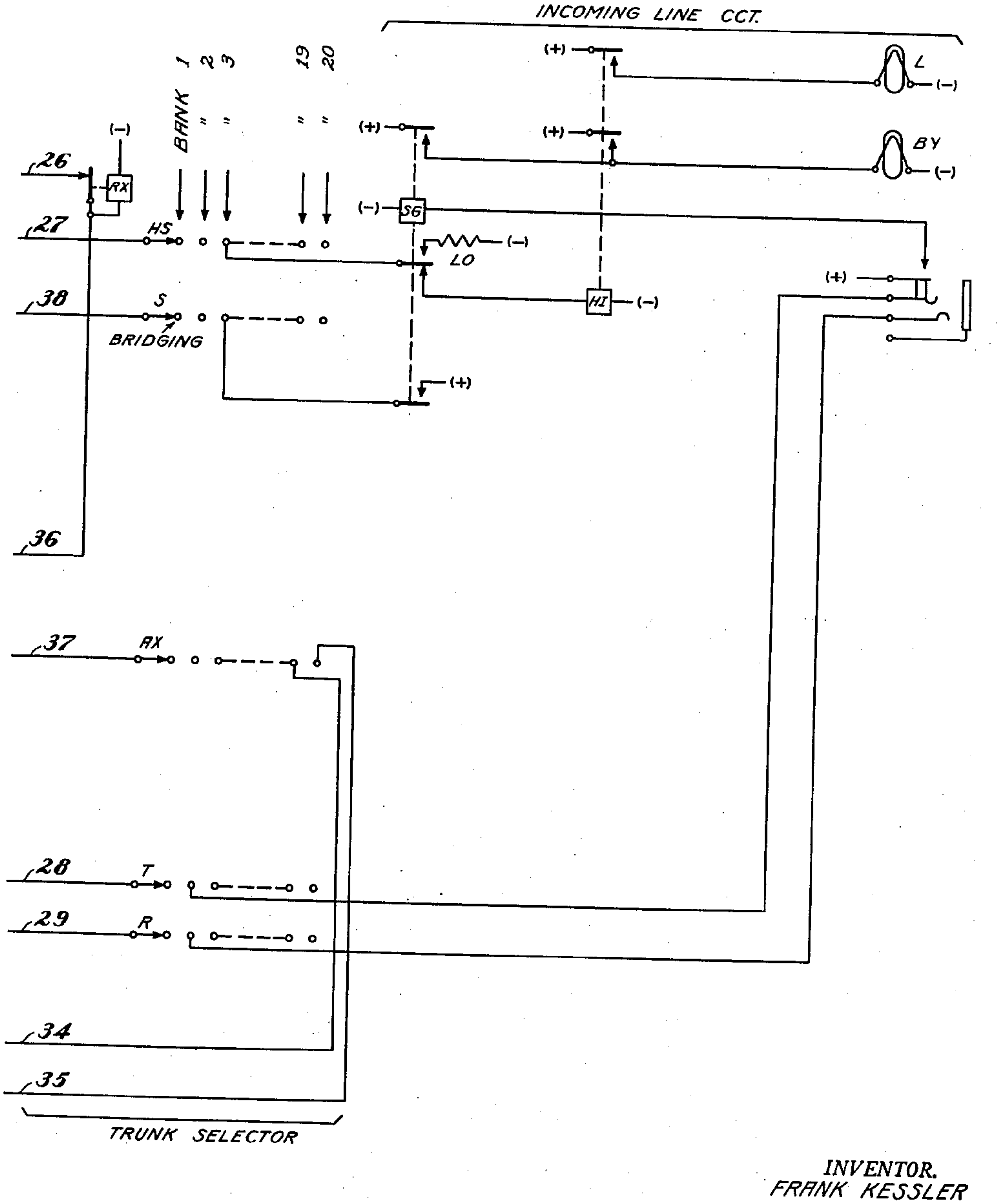
Fig. 5, Fig. 4-A
INVENTOR.
FRANK KESSLER
BY
Winfred T. Powell
ATTORNEY Patented July 29, 1952 2,605,362

UNITED STATES PATENT OFFICE 2,605,362

TELEPHONE PARTY LINE INTERCEPT CIRCUIT

Frank Kessler, Rochester, N. Y., assignor to Stromberg-Carlson Company, a corporation of New York Application July 7, 1948, Serial No. 37,458

12 Claims. (Cl. 179—27)

This invention relates to telephone systems and it more particularly pertains to automatic telephone systems including individual and party lines.

In telephone systems to which the present invention is applied, when one of the substations associated with a party line or when the substation associated with an individual line is removed from service for some reason, it is desirable to provide an arrangement whereby calls intended for the disconnected substations are routed to an operator's position so that the calling subscriber can be informed that the called substation is no longer in service. It is customary to refer to an arrangement of this type as intercept service, since calls directed to lines of this character are intercepted and re-directed to an operator's position.

Call intercepting service may also be desirable, for example to dead levels or unused levels in an automatic telephone system.

It is an object of the present invention to provide, in an automatic telephone system, improved apparatus of simple and economical construction which operates in a new and improved manner to intercept calls to a substation associated with an individual line or a party line and to route such calls to an operator's position.

Another object of the present invention is the provision of circuit arrangements whereby calls to stations on intercept may be connected directly to an operator's position or they may be extended by way of trunk selecting switches to one of several intercept trunks leading to the operator's position.

It is a further object of the present invention to provide circuits, in a party line system of any customary type of ringing, so arranged that only one call of a plurality of simultaneous calls to a number of lines connected to intercept may be associated with a common intercept circuit, with a lockout arrangement provided to permit the first call of the plurality to be connected to the common intercept circuit, with the other calls of said simultaneous calls being locked out and only permitted to seize the common intercept circuit in turn, one at a time, when the common intercept circuit becomes idle.

Further objects of the invention pertain to the particular arrangement of the circuit elements whereby the above and additional features are attained.

The novel features believed to be characteristic of the invention are set forth in the appended claims. The invention, both as to its organization and method of operation, together with further objects and advantages thereof will be best understood by a consideration of the following specification taken in connection with the accompanying drawings in which Figs. 1 to 5 inclusive taken together and arranged in the order named with correspondingly numbered or lettered lines in alignment, illustrate an intercept circuit arrangement having embodied therein the features of the invention briefly outlined above.

Figure 1:
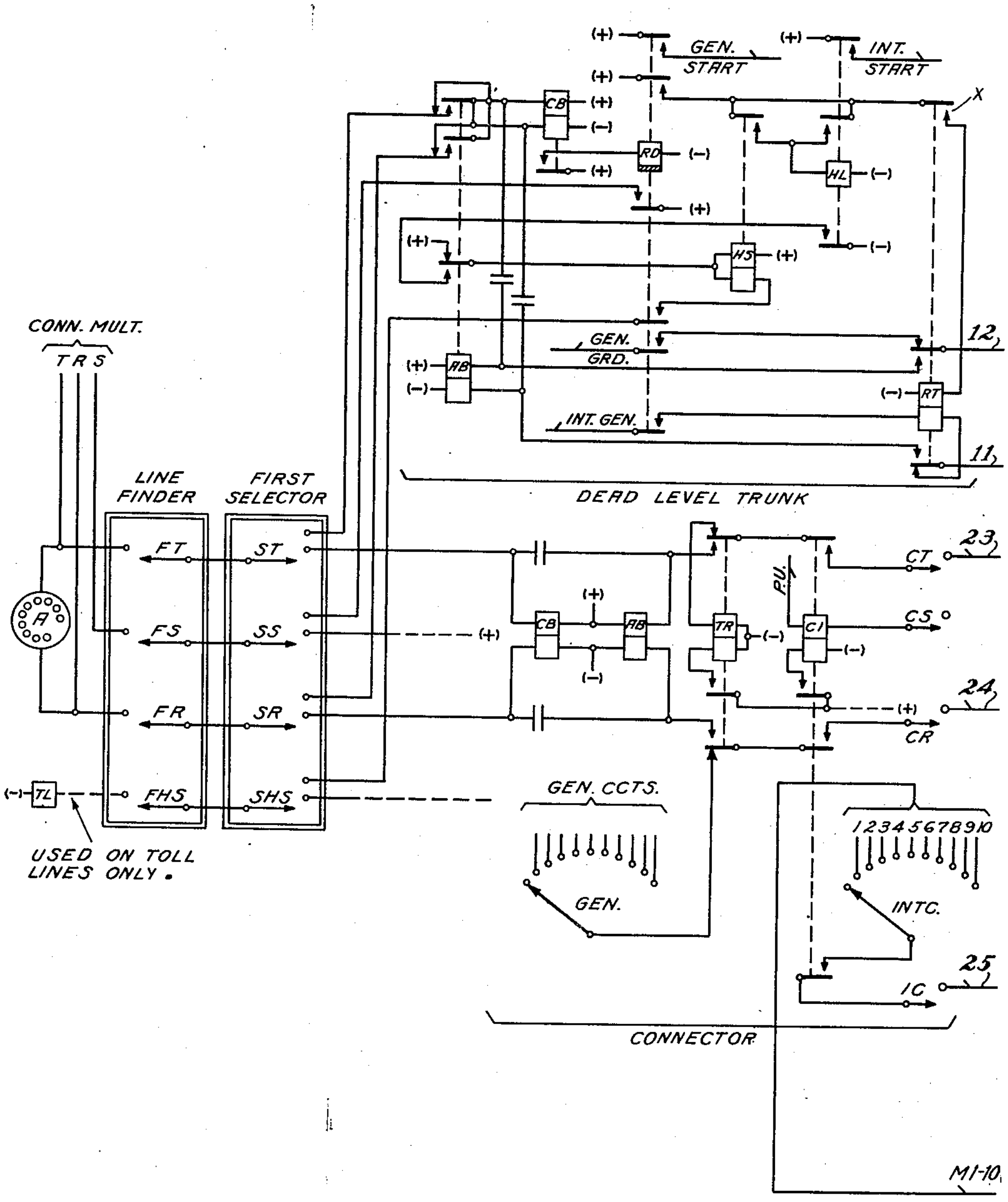
Figures 3, 4:
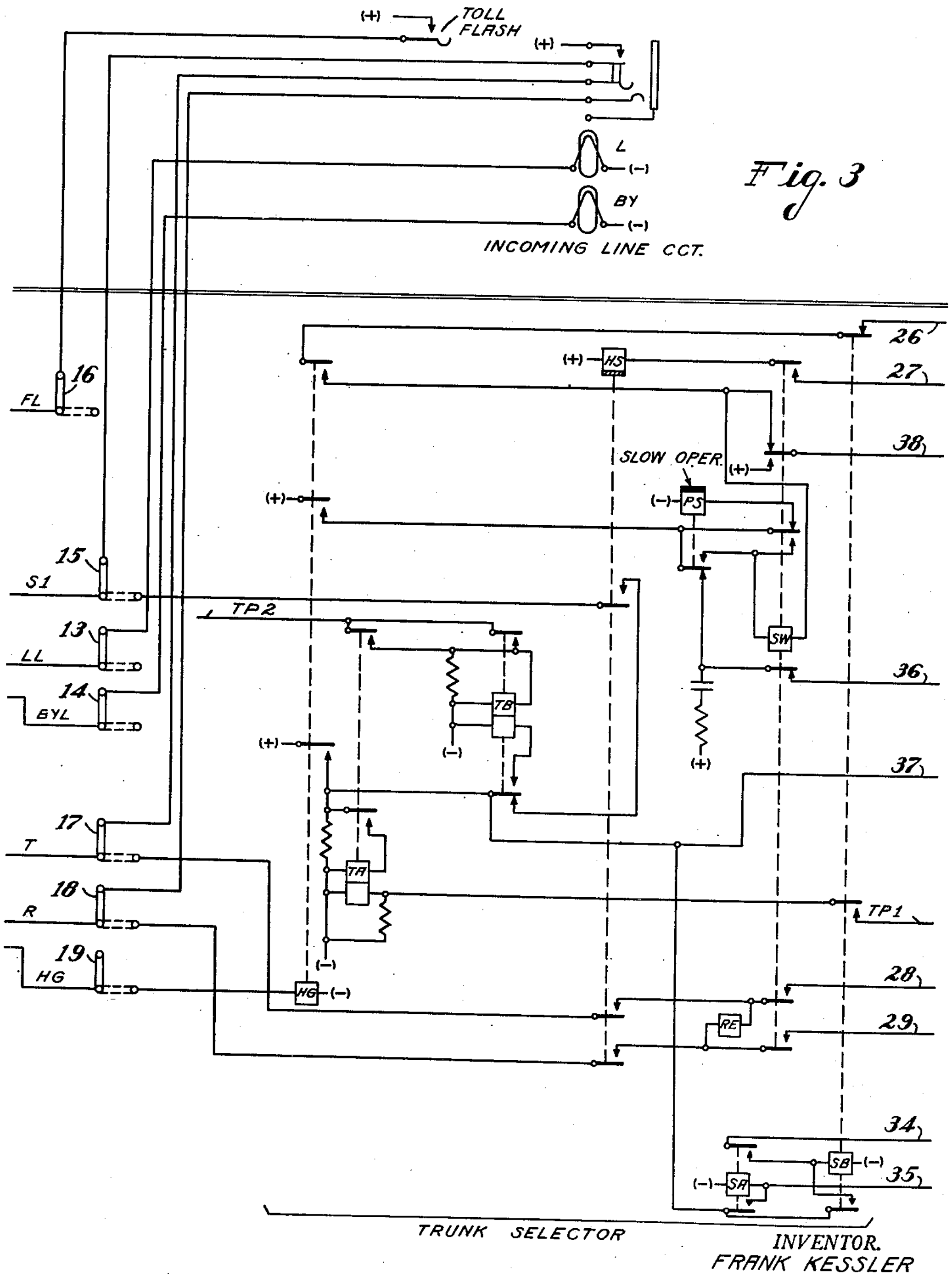

For the purpose of simplifying the illustrations and facilitating the explanation, the various parts and circuits constituting the embodiment of the invention have been shown diagrammatically and certain conventional illustrations have been employed, the drawings have been made more with the purpose of making it easy to understand the principles and mode of operation than with the idea of illustrating the specific construction and arrangement of parts that would be actually employed in practice. For example, the various relays and their contacts are illustrated in a conventional manner with all of the contacts controlled by a particular relay being associated with this relay by means of a dashed line. The finder and selector switches for associating a calling line with an intercept circuit are illustrated in block diagram, as shown within the heavy line rectangles in the left hand portion of Fig. 1, with the arrows associated with these switches indicating wipers or brushes for extending connections to sets of terminals in a conventional manner. Only a portion of a connector switch is illustrated in Fig. 1 with the straight line arrows illustrating the connector switch brushes of the connector link and with the slant line arrows associated with the terminals illustrated in semicircles illustrating a minor or station selector switch associated with the connector. A trunk selector switch of the single motion or uni-selector type is illustrated in Figs. 4 and 4A for extending an intercept circuit to one or more trunks extending to an operator's position. The negative side of the common exchange battery is indicated by (—) and the positive side of the exchange battery, which is usually grounded, is indicated by (+).

For convenience in illustrating and describing the features of the present invention, it is assumed that it is applied to a party line telephone system of the code ringing type or to a divided ringing system of the harmonic ringing type and furthermore, that the ringing arrangement is such as to provide for ten stations on a party line. It will be understood, however, that more than ten stations may be provided on a party line, 20 for example, by providing 20 different code rings in a code ringing system or by providing one and two rings in a divided ringing system of the harmonic type.

Figure 2:
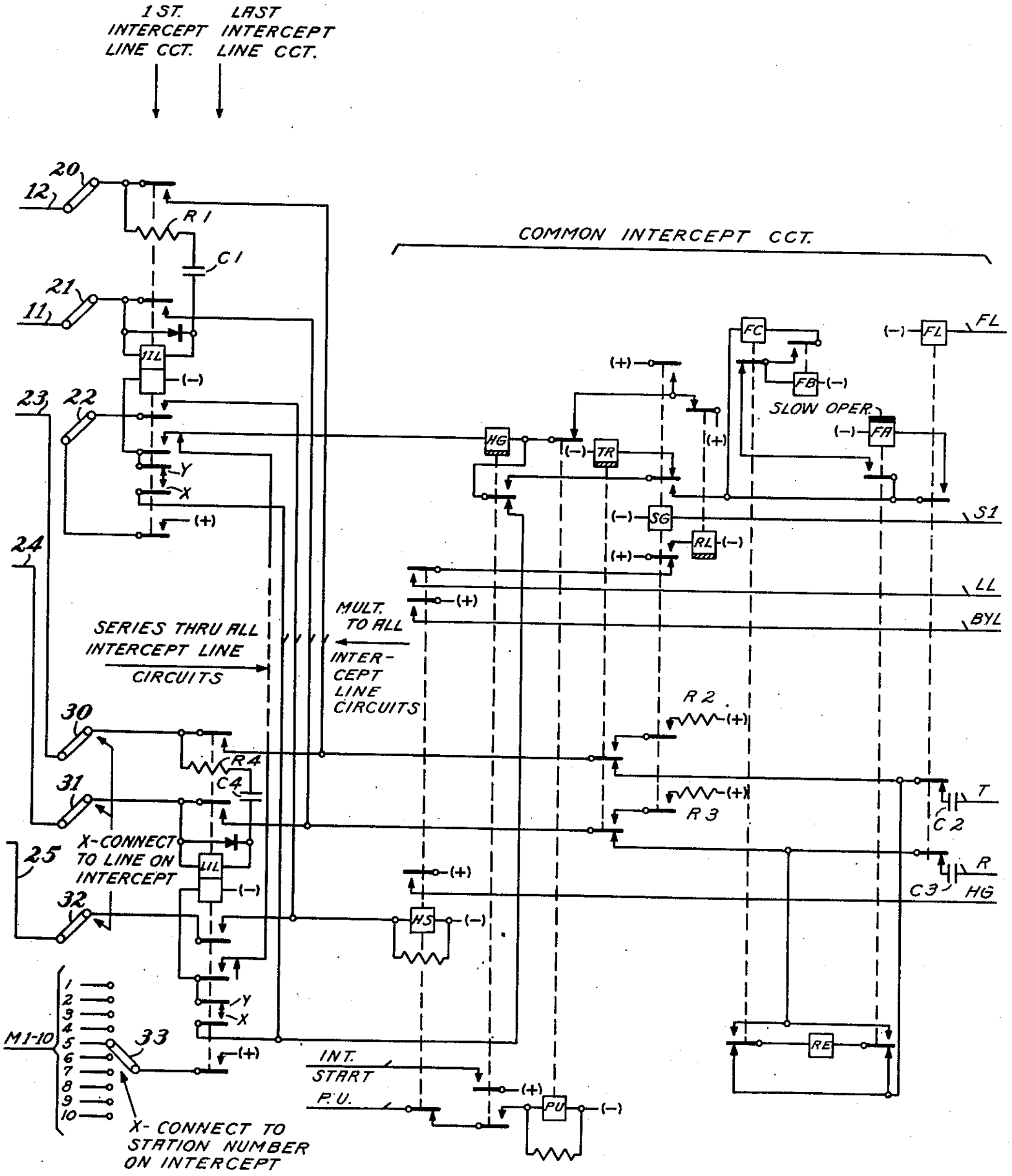

It is believed that the invention will be best understood by explaining in detail the circuit operations when connections are established from a calling substation, such as substation A illustrated in the left hand portion of Fig. 1, to a dead level trunk illustrated in the upper portion of Fig. 1 and also in connection with a call by way of the connector illustrated in the right hand portion of Fig. 1, with both type calls being extended to an intercept line circuit, two of which are illustrated in the left hand portion of Fig. 2, to a common intercept circuit illustrated in Fig. 2. It will further be assumed that such intercept calls are extended either directly to an operator's incoming line circuit illustrated in Fig. 3 or to an operator's circuit illustrated in Fig. 5 by way of a trunk selector illustrated in Figs. 4 and 4A.

In order to more clearly explain the operation of the circuits, only certain portions of the party line connector have been shown and the line finder and first selector are illustrated in schematic block diagram form only. The dead level trunk illustrated in Fig. 1 comprises a calling bridge or calling line battery feed relay CB for controlling a release delay relay RD. Ringing trip relay RT effects the ringing trip function for extending the called portion of the dead level trunk to the answering bridge or answering battery feed relay AB. Toll line relay HS operates when a call from a toll line is extended to the dead level trunk and an auxiliary relay HL is provided for a feature that will be explained in detail in the following description.

In connection with the connector circuit, only an abbreviated showing is disclosed in Fig. 1, this showing comprising calling battery feed relay CB (with no contacts shown on this relay) answering battery feed relay AB (with no contacts shown on this relay), trip relay TR and cut in relay CI. The minor switch associated with this connector comprises generator selecting wiper GEN and intercept wiper INTC, both stepped around by a motor magnet (not shown) in response to the dialing of the station digit associated with the called line. Connector tip brush CT, connector ring brush CR, connector sleeve brush CS and intercept control brush IC are controlled by the connector switch itself for selecting terminals associated with called lines.

Two line intercept circuits are illustrated in the left hand portion of Fig. 2, it being understood that there is a group of these line circuits, one for each line placed on intercept. Only the first and the last intercept line circuits of the group are shown, with the multiple and series connections to other intercept line circuits of the group being indicated. The first intercept line circuit is assumed to be connected to the dead level or unused level trunk illustrated in Fig. 1 while the second intercept line circuit is assumed to be connected to a line on intercept, this line being selected by the connector illustrated in Fig. 1. The jumper or cross connections are illustrated in connection with these intercept circuits, it being understood that only three jumpers are required to connect an intercept circuit to a dead level trunk, as illustrated in the upper portion of Fig. 2, while three jumpers are required for connecting an intercept line circuit to a telephone line on intercept, together with an extra jumper or cross connection for cross connecting to the station number of the station associated with the line to which the intercept circuit is connected. The intercept line relays are identified by reference to characters IL, the reference character LIL indicating the last intercept line circuit of the group.

The common intercept line circuit comprises relay HS which is controlled when a station on intercept is called, as will be explained in detail later. Holding relay HG, trip relay TR, signal relay SG and release relay RL are also provided in connection with the common intercept circuit. This common intercept circuit also comprises pickup relay PU, flashing relay FL, impedance coil RE, and auxiliary flash relays FA, FB and FC, all operating in a manner which will be described in detail.

The jumper connection shown in the left hand portion of Fig. 4 indicate that the common intercept circuit may be connected directly to an operator's trunk illustrated in Fig. 3 by connecting the jumpers as shown in full lines. By connecting these jumpers as illustrated by the dotted lines, the common intercept trunk may be connected to a trunk selector for selecting one of a group of operator's trunks illustrated in Fig. 5.

A call to a dead level connected to intercept will now be described. When the calling station, assumed to be station A, originates a call and dials the dead level number, the calling station is extended by way of the line finder and the first selector to the dead level trunk. Although the line finder and first selector circuits are not shown, these circuits may be of any conventional type well known to those skilled in the art for extending the connection to the dead level.

The closed circuit across the calling line operates relay CB of the dead level trunk, such circuit being traced from (+), upper winding of relay CB, break contact of relay AB, contacts and wipers ST and FT of the selector and finder respectively, tip side of the calling line, substation, ring side of the calling line, wipers FR and SR and their associated terminals of the line finder and selector respectively, break contact of relay AB and lower winding of relay CB to (−). The operation of relay CB closes an obvious circuit for operating relay RD and this relay in turn connects (+) back over the terminals and wipers SS and FS of the selector and finder respectively for holding these switches and for operating the cut off relay of the calling line, such circuits not being shown in detail but well understood in the art. Relay RD also applies (+) to the common generator start conductor for starting up the common ringing generator. If the call should happen to come from a toll line, (−) potential from the winding of the toll line relay TL is extended by way of finder and selector wipers FHS and SHS and their associated terminals, through the lower winding of relay HS to (+) at the break contact of relay AB, for operating relay HS, after which a circuit is closed through the make contacts of relays RD and HS for operating relay HL, this latter relay locking to (+) at the make contact of relay RD. It will be understood that relays HS and HL are not operated if the call comes from a regular line.

Interrupted generator is now extended over a circuit which may be traced from the common interrupter generator conductor, make contact of relay RD of the dead level trunk, lower winding of relay RT, break contact of relay RT, conductor 11, jumper 21, upper winding of relay 1IL and the rectifier in multiple, condenser C1, resistor R1, jumper 20, conductor 12, break contact of relay RT and make contact of relay RD to the generator ground which is the other side of the generator source. When the generator current is applied to the above described circuit, relay 1IL is operated, it being assumed that this relay is associated with the first intercept line circuit of the group. Relay 1IL closes a locking circuit for itself extending from (+), break contact of relay RL of the common intercept circuit, break contact of relay PU, break contact of relay HG, make contact X of relay 1IL, this X contact being arranged to close before any other contact of the relay is operated, break contact Y of relay 1IL and lower winding of relay 1IL to (—). This locking circuit for relay 1IL effects the energization of the relay to a sufficiently high level to operate all its contacts, it being understood that the current in the operating circuit of relay 1IL extending from the source of generator is of sufficient strength only to close the X contact of the relay. When relay 1IL has its lower winding energized over the above described circuit, the closure of the make before break contact of this relay closes a substitute locking circuit for the relay before the locking circuit including contact X is opened at contact Y of this relay. This circuit extends from (+), break contact of relay RL, break contact of relay PU, winding of relay HG, make before break contact of relay 1IL and lower winding of relay 1IL to (—). Until the Y contact of relay 1IL is opened, relay HG is short circuited but when this Y contact opens, the short circuit is removed from the winding of relay HG and this winding is included in series with the lower winding of relay 1IL, thus completing the substitute locking circuit for the 1IL relay and effecting the operation of relay HG. It will be understood that one or more of the other IL relays may be operated from ringing current on other calls to lines on intercept, but only their X contacts are closed because the operation of relay HG opens up the circuit to direct (+), thus preventing sufficient current to flow through these other X contacts for fully operating the associated IL relays.

Relay HS of the common intercept circuit is now operated over a circuit extending from (+), make contact of relay 1IL, jumper 22, make contact of relay 1IL and winding of relay HS to (—). The operation of relay HG energizes the common interrupter start conductor for providing pickup pulses on pickup conductor PU, one pulse between each ringing cycle, for a purpose which will be later explained. Relay TR is now operated over a circuit extending from (+), break contact of relay RL, break contact of relay PU, make contact of relay HG, break contact of relay SG and winding of relay TR to (—).

Assuming that the common intercept circuit is connected to the incoming line circuit of Fig. 3 by means of the full line jumper connections shown in the left hand portion of Fig. 4, the line lamp is now displayed over a circuit extending from (+), break contact of relay SG, make contact of relay HS, conductor LL, jumper 13 and line lamp to (—). The busy lamp BY is also lighted at this time over a circuit extending from (+), make contact of relay HS, conductor BYL, jumper 14 and lamp BY to (—).

When the operator answers the call by plugging into the jack illustrated in Fig. 3, the closure of the local contact of this jack extends (+) by way of jumper 15, conductor S1 and winding of relay SG to (—) for operating this relay. Relay SG closes an obvious circuit for operating relay RL at the same time that (+) is removed from conductor LL for extinguishing the line lamp. The operation of relay SG opens up and releases relay TR and during the interval between the operation of relay SG and the release of relay TR, (+) potential is extended through the resistors R2 and R3, make contacts of relay SG, make contacts of relay TR, make contacts of relay 1IL, jumpers 20 and 21, conductors 11 and 12, break contacts of relay RT of the dead level trunk and the lower winding of this relay to the generator source by way of make contacts of relay RD. This circuit effects the operation of relay RD but relay AB receives insufficient current over this circuit to operate, thus tripping the ring and preventing the reversal of battery back to the calling line. Relay RT of the dead level trunk closes a locking circuit for itself extending from (+), make contact of relay RD, make contact X of relay RT and its upper winding to (—).

The connection is now extended from the calling line through the talking condensers of the dead level trunk, condensers C2 and C3 of Fig. 2 and jumpers 17 and 18 to the operator's circuit so that the operator may give proper instructions to the calling subscriber. When the operator takes down the connection, (+) is removed from conductor S1 for releasing relay SG of the common intercept circuit and this relay in turn opens up and releases relay RL. The release of relay SG also removes (+) from the right hand terminal of the winding of relay HG and before this (+) is re-established by the release of relay RL, relay HG and relay 1IL are released since these two relays were energized in series. The release of relay 1IL opens up and releases relay HS and this relay in turn de-energizes the busy lamp. During the interval between the release of relay SG and the consequent release of relay HS, the line lamp is momentarily flashed as an indication that the connection is being released while the calling party is still on the line. When the calling party hangs up, relay CB is released for effecting the release of relays RD and RT of the dead level trunk. If this is a call from a toll line, the release of relay RD opens up and releases relays HS and HL.

If the calling party hangs up first the finder, the selector and the dead level trunk will be restored to normal and then when the operator takes down the connection the common intercept circuit and the intercept line will be released as previously described.

In the event that the intercepted call is from a toll line and the intercept operator desires to flash back to the toll line operator, the toll flash key of Fig. 3 is intermittently operated. Each operation of this key extends (+) by way of jumper 16 and conductor FL to the winding of relay FL for intermittently operating this relay. The operation of relay FL closes a circuit for operating slow operate relay FA extending from (+), make contact of relay SG, break contact of relay PU, make contact of relay HG, make contact of relay SG, make contact of relay FL and winding of relay FA to (—). The operation of relay FA extends this circuit through a break contact of relay FC to the winding of relay FB for operating this latter relay. When the key is released, relay FL releases for opening up and releasing relay FA and the release of relay FA closes a locking circuit for relay FB and an operating circuit for relay FC extending from (+), make contact of relay SG, break contact of relay PU, make contact of relay HG, make contact of relay SG, winding of relay FC, make contact and winding of relay FB to (−). Relays FB and FC remain energized during the intermittent operation of the flash key and relays FA and FL follow the intermittent operation of this key. Since relay TR is released during this flashing operation, the tip and ring conductors 11 and 12 extending back to the dead level trunk are intermittently opened and closed. These conductors are closed when relay FA operates, the circuit being traced from conductor 11, jumper 21, make contact of relay 1IL, break contact of relay TR, make contact of relay FA, winding of coil RE, break contact of relay FC, break contact of relay TR, make contact of relay 1IL and jumper 20 to conductor 12. This closure of conductors 11 and 12 operates relay AB of the dead level trunk, this relay being released when relay FA releases to open up the above described circuit. Now when relay FC operates, conductors 11 and 12 are again connected together by way of the lower make contact of relay FC, coil RE and lower break contact of relay FA. These conductors are next opened when relay FA operates to open its lower break contact. During the following intermittent operations of relay FA, these conductors 11 and 12 are flashed, the circuit being closed at each release of relay FA and opened at each operation of relay FA. The intermittent flashing of conductors 11 and 12 effects the intermittent operation of relay AB of the dead level trunk which intermittently reverses the battery back to the toll line circuit for flashing the supervisory lamp at the toll line position. When the flash is stopped, relay FL stops flashing, relay FA remains released and relay FC remains operated, thus keeping conductors 11 and 12 closed through coil RE. When the intercept operator takes down the connection, the release of relay SG opens up and releases relays FB and FC for restoring the circuits to normal.

It will now be explained how the circuits function in connection with a call to a line connected to one of the intercept line circuits, for example the last intercept line circuit of the group including relay LIL. It will be assumed that this call is extended directly to an operator's circuit such as that illustrated in Fig. 3. When the connector of Fig. 1, is selected it is operated in the well known manner for connecting with a called line. Cut in relay CI may be operated by a pickup circuit comprising pickup conductor P. U. connected to the upper winding of this relay, the circuit (not shown in detail) being controlled when the sleeve wiper CS of the connector connects with an idle line. This operation of relay CI extends the line conductor of the called line, by way of connector wipers CT and CR, to the generator circuit selected by the minor switch in response to the dialing of the station digit.

It will first be assumed that the terminals comprising conductors 23 and 24 of the called line are connected by way of cross connecting jumpers 30 and 31 to the last intercept line circuit illustrated in the lower left hand portion of Fig. 2. It will further be assumed that the minor switch of the connector is advanced to a terminal corresponding to a station on this line which is not connected for intercept service, for example terminal #4 selected by wipers GEN and INTC of the minor switch. When the interrupted generator (which may be a selected coded generator of a single frequency or selected generators of harmonic frequencies) is applied to conductor 24, this generator current is then extended by way of jumper 31, upper winding of relay LIL and the associated rectifier in multiple, condenser C4, resistor R4, jumper 30, conductor 23, connector wiper CT and its associated terminal, make contact of relay CI, break contact and upper winding of relay TR to (−). Relay LIL will be intermittently operated in correspondence with the intermittent generator applied to the called line, but since cross connecting jumper 33 is not connected to the #4 terminal, while wiper INTC is connected to the #4 terminal, this call is not intercepted. Consequently, the circuit by way of conductor 25 and jumper 32 of the called line is not effective to operate relay HS of the common intercept circuit, this circuit being open at terminal #4 of cross connecting jumper combination 33.

The operation of relay LIL closes, at its X contact, a circuit for energizing its lower winding to cause this relay to switch all of its contacts, this circuit being similar to that previously described for relay 1IL. Relay LIL locks itself operated by way of its lower winding and its make before break contact in series with relay HG of the common intercept circuit for operating this latter relay. Relay HG starts up the common interrupter and since relay HS is not operated when common pickup conductor P. U. is pulsed following the completion of the ringing cycle, relay PU of the common intercept circuit is operated for opening up and releasing relays HG and LIL, thus giving another line on intercept a chance to operate its IL relay. When the call is answered or abandoned the operation of trip relay TR of the conductor or the release of the connector discontinues the application of ringing current to the called line and the consequent operation of relay LIL, thus restoring the intercept circuits to normal.

It will now be explained how the circuits function in connection with a call to a station on the line illustrated, with this station being out of service and arranged for intercepting the call. The connector seizes the called line in the previously described manner and the ringing current operates relay LIL which locks and operates relay HG for starting up the interrupter, all in the previously described manner. In this example, it is assumed that the minor switch of the connector is on terminal #5 and since cross connecting jumper 33 is connected to terminal #5, a circuit is completed for operating relay HS, this circuit being entirely independent of the ringing current which is applied to the called line. This circuit may be traced from (+), lowermost make contact of relay LIL, jumper 33 and terminal #5, the #5 conductor included in the group of conductors indicated MI–10, terminal #5 and wiper INTC of the connector minor switch, make contact of relay CI, wiper IC and associated terminal of the connector, conductor 25, jumper 32, make contact of relay LIL and winding of relay HS to (−). The operation of relay HS opens up the common pickup conductor so that the circuit will not be cleared out following the ringing cycle as was described in connection with the previous example.

The line lamp of Fig. 3 is now displayed over the previously described circuits controlled by the common intercept circuit and relay TR is operated by the operation of relay HG. When the operator answers, relays SG and RL are operated in the previously described manner for extinguishing lamp L and for operating relay TR of the connector without operating relay AB, all in the previously described manner. The talking circuit is now extended through the condensers of the connector, make contacts of relays TR and CI, connector wipers CT and CR, conductors 23 and 24, jumpers 30 and 31, make contacts of relay LIL, break contacts of relay TR of the common intercepted circuit, break contacts of flash relay FL, condensers C2 and C3, tip and ring conductors T and R and jumpers 17 and 18 to the jack associated with the incoming line circuit. After conversation is terminated and the calling party hangs up for effecting release of the connector, relay HS of the common intercept circuit is released because conductor 25 is de-energized. The release of relay HS extinguishes the busy lamp. If the operator is slow in taking down the connections after the calling party hangs up, the release of relay HS connects the common pickup interrupter to the pickup relay for operating this relay between the ringing cycles for effecting the release of the connection in the previously described manner. When the operator takes down the connection the local contact of the jack is opened for releasing relay SG and this relay in turn opens up and releases relays RL, LIL and HG for restoring the circuits to normal ready for the next call.

It will now be explained how the circuits function when a call is set up to a station on intercept and the common intercept circuit is extended to an operator's trunk circuit by way of the trunk selector illustrated in Figs. 4 and 4A. It will be assumed that the last intercept line circuit is selected in response to a call to the same station as previously described and that the switching through of the connector of Fig. 1 operates relay LIL of this intercept circuit. Relays HG, HS and TR of the common intercept circuit are operated as before, but since the jumpers in the left hand portion of Fig. 4 are connected in their dotted line positions, the circuit to Fig. 3 is not used.

The operation of relay HS of the common intercept circuit closes a circuit for operating relay HG of the trunk selector, this circuit extending from (+), make contact of relay HS of the common intercept circuit, conductor HG, jumper 19 and winding of relay HG of the trunk selector to (—). Relay HG closes a circuit for operating the slow to operate preliminary step relay PS extending from (+), make contact of relay HG, break contact of relay SW and winding of relay PS to (—). A circuit is also closed at this time for operating the trunk selector step magnet RX extending from (+), make contact of relay HG, break contact of relay PS, break contact of relay SW, conductor 36 and winding of magnet RX to (—). This circuit to magnet RX is maintained energized for a comparatively long time interval, at the end of which relay PS operates to open up the circuit to magnet RX, thus allowing the trunk selector to step from its #1 to its #2 terminal, assuming that the switch is standing on terminal #1 when relay HG is operated. This provides means for causing the trunk selector to take at least one step, even though it is resting on terminals associated with an idle trunk when relay HG is operated.

After the trunk selector takes its preliminary step it will be advanced step by step until an idle trunk is reached. The circuit for advancing the trunk selector over busy terminals may be traced from (+) appearing on the busy terminals contacted by sleeve wiper S (this (+) being applied over a circuit that will be later described), wiper S, conductor 38, break contact of relay SW, make contact of relay HG, break contact of relay SB, conductor 26, break contact and winding of magnet RX to (—). Since this provides a self-interrupting circuit for magnet RX the trunk selector switch will be advanced until an idle set of terminals is reached, at which time the absence of (+) potential on the terminal contacted by wiper S effects the operation of switching relay SW over a circuit which may be traced from (+), make contact of relay HG, make contact of relay PS, winding of relay SW, make contact of relay HG, break contact of relay SB, conductor 26, break contact and winding of magnet RX to (—). It will be understood that sufficient current flows in this circuit to operate relay SW but not to cause the operation of magnet RX. The operation of relay SW closes a locking circuit for itself extending from (+), make contact of relay HG, make contact and winding of relay SW and over the previously described circuit to magnet RX. The operation of relay SW opens up and releases relay PS. The opertaion of relay SW applies (+) to wiper S and its associated terminal for making this trunk busy.

High resistance relay HI associated with the incoming line circuit of Fig. 5 is now operated over a circuit extending from (+), winding of relay HS of the trunk selector, make contact of relay SW, conductor 27, wiper HS and its associated terminal (assumed to be terminal #3), break contact of relay SG and winding of relay HI to (—). The operation of relay HI closes obvious circuits for lighting line lamp L and busy lamp BY associated with the incoming line circuit.

When the operator answers the call by plugging into the jack the local contact of this jack completes a circuit for operating relay SG. Relay SG applies (+) potential to the sleeve terminal and associated wiper of the trunk selector for maintaining this trunk busy as long as the plug is in the jack. The operation of relay SG also opens up and releases relay HI for extinguishing the line lamp, the busy lamp being maintained energized over another circuit extending to (+) at a make contact of relay SG. The operation of relay SG also closes a circuit for operating relay HS of the trunk selector extending from (+), winding of relay HS, make contact of relay SW, conductor 27, wiper and terminal HS of the trunk selector, make contact of relay SG and the low resistance resistor LO to (—). The operation of relay HS extends the called end of the connector through to the operator circuit, since relay SW has previously been operated, this circuit extending by way of conductors 28 and 29 and wipers T and R of the trunk selector.

The operation of relay HS of the trunk selector also closes a circuit for operating relay SG of the common intercept circuit extending from (+), make contact of relay HG of the trunk selector, break contact of relay TB, make contact of relay HS, jumper 15, conductor S1 and winding of relay SG to (—). The operation of relay SG closes an obvious circuit for operating relay RL and also opens up and releases relay TR for operating trip relay TR of the connector during the interval between the operation of relay SG and the release of relay TR. Relay AB of the connector is not operated.

This places the circuits in talking condition and after the conversation is terminated the hanging up of the receiver by the calling party effects the release of the connector for opening up and releasing relay HS of the common intercept circuit. Relay HS opens up and releases relay HG of the trunk selector and this relay in turn effects the release of relays SW and HS. The release of relay HG of the trunk selector opens up and releases relay SG of the common intercept circuit which in turn opens up and releases relays HG, RL and LIL. When the operator takes down the connection the local contact of the jack is opened for effecting the release of relay SG for extinguishing the busy lamp and thus placing the circuits in normal condition ready for the next call.

The trunk selector illustrated in Figs. 4 and 4A is arranged to make a complete test of all outgoing trunks by making a full sweep of the bank contacts under the "all trunks busy" condition to determine if there might be one or more idle trunks in the group. In order to explain the operation of the trunk selector when all trunks selected thereby are busy, it will be assumed that this switch is standing on point #18 when a call is extended to the trunk selector. It will further be assumed that all trunks accessible to the trunk selector are busy and it will be pointed out how this switch steps from point 18, past point 19 to point 20 and then makes a complete excursion of all of the terminals to which it has access, finally stopping at point 19. Thus, the switch tests trunk #19 twice before it is stopped in response to an all trunks busy condition.

Relay HG of the trunk selector is operated when relay HS of the common intercept circuit is operated, followed by the operation of relay PS and magnet RX of the trunk selector, all in the previously described manner. Since it is assumed that the trunk selector switch is on point 18, the operation of relay PS opens up and releases magnet RX for advancing the switch to terminal 19. Since it is assumed that all trunks in the group are busy, wiper S of the trunk selector will encounter (+) potential on all terminals for operating the switch step by step past terminals #19 and #20, back to terminal #1 and up to terminal #19 again. When the trunk selector reaches terminal #20, a circuit is closed for operating relay SA extending from (+), make contact of relay HG, conductor 37, wiper AX and bank #20, conductor 35 and winding of relay SA to (−). Relay SA closes a locking circuit for itself extending from (+), make contact of relay HG, make contact and winding of relay SA to (−). This holds relay SA operated while the switch is stepping over the terminals of its bank and when it gets back to terminal #19 a circuit is closed for operating relay SB extending from (+), make contact of relay HG, conductor 37, wiper AX and bank #19, conductor 34, make contact of relay SA and winding of relay SB to (−). Relay SB closes a locking circuit for itself extending from (+), make contact of relay HG, make contact and winding of relay SB to (−).

The operation of relay SB opens up the self interrupting circuit for magnet RX, thus stopping the trunk selector switch at bank terminal #19, it being assumed that this terminal is associated with a busy trunk, consequently, relay SW is not operated. Time pulse conductors TP1 and TP2 are sequentially energized for clearing out the connection under the above described condition. When the (+) pulse is applied to conductor TP1, it is extended through a make contact of relay SB and the lower winding of relay TA to (−) for operating this relay which locks by way of its upper winding to (+) at the make contact of relay HG. After a predetermined time interval is measured off, following the pulse on conductor TP1, conductor TP2 is pulsed for operating relay TB over a circuit extending from (+) on conductor TP2, make contact of relay TA and upper winding of relay TB to (−). Relay TB closes a locking circuit for itself extending from (+), make contact of relay HG, make contact and lower winding of relay TB to (−).

The operation of relay TB opens up and releases relay SG of the common intercept circuit. This releases relays HG and RL of the common intercept circuit and relay LIL of the intercept line circuit. Relay LIL opens up and releases relay HS of the common intercept circuit, which in turn opens up and releases relay HG of the trunk selector. This effects the release of relays PS, SA, SB, TA and TB of the trunk selector, thus restoring all circuits to normal except the connector switch which is held by the calling subscriber. This connector switch is released when the calling subscriber hangs up, it being understood that the line intercept relay LIL cannot be again operated on this connection because the ringing current at the connector switch has been tripped.

Having described an intercept system as particularly adaptable for selective type communication systems of the individual or party line ringing type, it is desired to have it understood that this form is selected to facilitate the disclosure of the invention rather than to limit the number of forms which it may assume and it is to be further understood that various modifications, adaptations and alterations may be applied to the specific form shown to meet the requirements of practice without in any manner departing from the spirit or scope of the invention except as limited by the appended claims.

What I claim is:

1. In an automatic telephone system a plurality of party lines, a connector switch controlled from a first one of said lines to route a connection to a second one of said lines, a selector switch having used and un-used levels and controllable from said first line to route a connection to said connector, a plurality of call intercepting circuits, one of said call intercepting circuits being operatively associated with said second one of said lines and another being operatively associated with an un-used level of said selector, a plurality of alternating current responsive relays, one of said relays being operatively associated with each of said call intercepting circuits, means responsive to a call to said second one of said lines or to said un-used level for operating the alternating current responsive relay of the corresponding call intercepting circuit, means responsive to the operation of any one of said relays for preventing the operation of any others of said alternating current relays, and means responsive to the operation of any one of said alternating current responsive relays for extending the call to a common intercept circuit.

2. In an automatic telephone system, a plurality of party lines, a connector switch controlled from a first one of said lines to route a connection to a second one of said lines, a selector switch having used and un-used levels and controllable from said first line to route a connection to said connector, a plurality of call intercepting circuits, one of said call intercepting circuits being operatively associated with said second one of said lines and another being operatively associated with an un-used level of said selector, a plurality of alternating current responsive relays, one of said relays being operatively associated with each of said call intercepting circuits, means responsive to a call to said second one of said lines or to said un-used level for operating the alternating current responsive relay of the corresponding call intercepting circuit, means responsive to the operation of any one of said relays for preventing the operation of any others of said alternating current relays, and means responsive to the operation of any one of said alternating current responsive relays for extending a call to an operator's position.

3. In a telephone system, a line including talking conductors and a sleeve conductor, an automatic switch having access to said line and including means for applying ringing voltage to said talking conductors and guarding potential to said sleeve conductor, an intercept control wiper on said switch, means including said switch for routing a call to said line from a second line of said system, an operator's position, a control device, means for cross connecting said control device to said line, a control relay associated with said control device, a primary operating circuit for said control relay including said talking conductors for causing the partial operation of the relay in response to said ringing voltage, a secondary operating circuit for said control relay prepared in response to said partial operation, means for completing said secondary operating circuit to cause said control relay to complete its operation, and means including said intercept control wiper and a contact closed only in the completely operated position of said control relay for extending said call to said operator's position.

4. In a telephone system, a plurality of lines, each including talking conductors and a sleeve conductor, an automatic switch having access to said lines and including means for applying ringing voltage to said talking conductors and guarding potential to said sleeve conductor of any one of said lines, an intercept control wiper on said switch, means including said switch for routing a call to a first one of said lines from a second line of said system, a common intercept circuit, a plurality of control devices, means for cross connecting one of said control devices to said first line and for cross connecting others of said control devices to other lines of the system, a plurality of control relays, a control relay operatively associated with each of said control devices, a primary operating circuit for each of said control relays including said talking conductors of the corresponding cross-connected line for causing partial relay operation in response to said ringing voltage, a secondary operating circuit for each of said control relays prepared in response to said partial operation, means for completing the secondary operating circuit corresponding to said first line to cause the control relay operatively associated therewith to complete its operation only when no other relay of the plurality is operated, and means including said intercept control wiper and a contact closed only in the completely operated position of the control relay corresponding to said first line for extending said call to said common intercept circuit.

5. In a telephone system; a plurality of lines, each including talking conductors and a sleeve conductor; an automatic switch having access to said lines and including means for applying ringing voltage to said talking conductors and guarding potential to said sleeve conductor of any one of said lines; an intercept control wiper on said switch; means including said switch for routing a call to a first one of said lines from a second line of said system; a common intercept circuit; a plurality of control devices; means for cross connecting one of said control devices to said first line and for cross connecting others of said control devices to other lines of the system; a plurality of control relays, a control relay operatively associated with each of said control devices; a primary operating circuit for each of said control relays including said talking conductors of the corresponding cross connected line for causing partial relay operation in response to said ringing voltage; a secondary operating circuit for each of said control relays prepared in response to said partial relay operation; means for completing the secondary operating circuit corresponding to said first line to cause the control relay operatively associated with said first line to complete its operation only when no other relay of the plurality is operated; and means including said intercept control wiper and a contact closed only in the completely operated position of said the control relay corresponding to said first line for extending said call to said common intercept circuit, said last named means also including a common cross connection.

6. In a telephone system; a plurality of lines, each including talking conductors and a sleeve conductor; an automatic switch having access to said lines and including means for applying ringing voltage to said talking conductors and guarding potential to said sleeve conductor of any one of said lines; an intercept control wiper on said switch; means including said switch for routing a call to a first one of said lines from a second line of said system; a common intercept circuit; a plurality of control devices; means for cross connecting a first one of said control devices to said first line and for cross connecting others of said control devices to other lines of the system; a plurality of control relays, a control relay operatively associated with each of said control devices; a primary operating circuit for each of said control relays including said talking conductors of the corresponding cross connected line for causing partial relay operation in response to said ringing voltage; a secondary operating circuit for each of said control relays prepared in response to said partial operation; means for completing the secondary operating circuit corresponding to said first line to cause the control relay operatively associated with said first line to complete its operation only when no other relay of the plurality is operated; and means including said intercept control wiper and a contact closed only in the completely operated position of the control relay corresponding to said first line for extending said call to said common intercept circuit, said last named means also including a common cross connection connected to correspond with a particular station number on said line.

7. In an automatic telephone system, a party line, an automatic switch having access to said line and including a pair of talking wipers and a control wiper, a station selector having a pair of wipers, means including said pair of talking wipers on said switch and one of said wipers on said station selector for selectively signaling substations on said line, an operator's position, a trunk terminating at said position, a trunk selector having access to said trunk and operative to extend a connection from said line to said operator's position when a call to a substation on said line by way of said automatic switch is to be intercepted, and means including said control wiper of said switch and the other of said wipers of said station selector for initiating the operation of said trunk selector.

8. In an automatic telephone system, a party line, an automatic switch having access to said line and including a pair of talking wipers and a control wiper, a station selector having a pair of wipers, means including said pair of talking wipers on said switch and one of said wipers on said station selector for selectively signaling substations on said line, an operator's position, trunks terminating at said position, a non-homing trunk selector having access to said trunks and operative to extend a connection from said line to said operator's position when a call to a substation on said line by way of said automatic switch is to be intercepted, means including said control wiper of said switch and the other of said wipers of said station selector for initiating the operation of said trunk selector, and means for causing said trunk selector to take at least one step even though it is resting on terminals associated with an idle trunk when said operation is initiated.

9. In an automatic telephone system, a party line, an automatic switch having access to said line and including a pair of talking wipers, a station selector, a plurality of ringing circuits selectable by said station selector, means including said pair of talking wipers on said switch and one of said ringing circuits selected by said station selector for selectively signaling substations on said line, an operator's position, a trunk terminating at said position, a trunk selector having access to said trunk and operative to extend a connection from said switch to said operator's position when a call to a substation on said line by way of said automatic switch is to be intercepted, a plurality of marking wires corresponding to the selective positions of said station selector, a source of marking potential, means for connecting said potential to any one of said marking wires, and means including said source of marking potential, that one of said marking wires which corresponds to the substation to be signalled, and said station selector for initiating the operation of said trunk selector.

10. In an automatic telephone system, a party line, an automatic switch having access to said line, a station selector operatively associated with said switch, means including a pair of talking wipers on said switch and a plurality of ringing circuits selected by said station selector for selectively signaling substations on said line, an operator's position, trunks at said position, a trunk selector having access to said trunks and operative to extend a connection from said switch to said operator's position, a plurality of marking wires corresponding to the selective positions of said station selector, means including apparatus connectively associated with said line for selectively applying marking potential to any one of said marking wires, means responsive to the application of marking potential to a marking wire which corresponds to the position taken by said station selector when signaling one of said substations for initiating the operation of said trunk selector, and means for causing said trunk selector to test at least one of said trunks twice when all trunks are busy and to thereafter stop trunk hunting.

11. In an automatic telephone system; party lines; a connector switch controlled from a first one of said lines to route a connection to a second one of said lines; a pair of talking wipers, a make busy wiper and a control wiper on said switch; call intercepting apparatus connectively associated with said second line; a call responsive device associated with said apparatus and responsive to a call to said second line; a trunk hunting selector; a plurality of intercept trunks accessible to said selector; means controlled over said talking wipers for operating said device; and means including said control wiper and responsive to the operation of said device for causing said trunk hunting selector to hunt for and select one of said intercept trunks.

12. In an automatic telephone system; party line; a connector switch controlled from any one of said lines to route a connection to a second line; a pair of talking wipers, a make busy wiper and a control wiper on said switch; call intercepting apparatus operatively associated with said second line; a call responsive device associated with said apparatus and responsive to a call to said second line; a trunk hunting selector; a plurality of interecept trunks accessible to said selector; means controlled over said talking wipers for operating said device; means including said control wiper and responsive to the operation of said device for causing said trunk hunting selector to hunt for and select one of said intercept trunks; and means for causing said trunk hunting selector to test one of said intercept trunks twice when and only when all of said intercept trunks are busy and to thereafter stop trunk hunting.

FRANK KESSLER.

REFERENCES CITED

The following references are of record in the file of this patent:

UNITED STATES PATENTS

| Number | Name | Date |
|---|---|---|
| 1,541,386 | Polinkowsky | June 9, 1925 |
| 1,613,613 | Kopp | Jan. 11, 1927 |
| 1,648,031 | Ruggles | Nov. 8, 1927 |
| 1,757,446 | Wright | May 6, 1930 |
| 1,897,048 | Hatton | Feb. 14, 1933 |
| 2,344,634 | Powell | Mar. 21, 1944 |
| 2,379,456 | Rhoads | July 3, 1945 |

OTHER REFERENCES

Relays in Automatic Telephony by R. W. Palmer, 1930, pages 71 and 72.